(12) United States Patent  (10) Patent No.: US 6,689,439 B2
Sobolewski  (45) Date of Patent: Feb. 10, 2004

(54) MICRO-STUD DIFFUSION SUBSTRATE FOR USE IN FUEL CELLS

(76) Inventor: Zbigniew S. Sobolewski, 1641 Sunset St., Longmont, CO (US) 80501

( * ) Notice: Subject to any disclaimer, the term of this patent is extended or adjusted under 35 U.S.C. 154(b) by 0 days.

(21) Appl. No.: 09/801,180

(22) Filed: Mar. 7, 2001

(65) Prior Publication Data

US 2001/0036523 A1 Nov. 1, 2001

Related U.S. Application Data

(60) Provisional application No. 60/187,781, filed on Mar. 8, 2000.

(51) Int. Cl.[7] ............ B29D 22/00; B32B 9/00; B32B 1/08; D02G 3/00; H01M 8/10
(52) U.S. Cl. .............. 428/36.9; 428/367; 428/119; 428/120; 429/30; 429/31; 429/33; 313/309
(58) Field of Search ............ 428/36.9, 367, 428/119, 120; 429/31, 30, 33; 313/309

(56) References Cited

U.S. PATENT DOCUMENTS

| | | | |
|---|---|---|---|
| 4,898,792 A | * | 2/1990 | Singh et al. ............ 429/19 |
| 5,176,966 A | | 1/1993 | Epp et al. ............ 429/26 |
| 5,284,718 A | | 2/1994 | Chow et al. ............ 429/26 |
| 5,424,054 A | * | 6/1995 | Bethune et al. ........ 423/447.2 |
| 5,672,439 A | | 9/1997 | Wilkinson et al. ........ 429/40 |
| 5,800,706 A | | 9/1998 | Fischer ............ 210/198.2 |
| 5,840,438 A | | 11/1998 | Johnson et al. ............ 429/30 |
| 5,874,182 A | | 2/1999 | Wilkinson et al. ........ 429/30 |
| 5,985,112 A | | 11/1999 | Fischer ............ 204/283 |
| 6,080,501 A | * | 6/2000 | Kelley et al. ............ 429/31 |
| 6,232,706 B1 | * | 5/2001 | Dai et al. ............ 313/309 |
| 6,312,303 B1 | * | 11/2001 | Yaniv et al. ............ 445/24 |
| 6,361,861 B2 | * | 3/2002 | Gao et al. ............ 428/367 |

* cited by examiner

Primary Examiner—Harold Pyon
Assistant Examiner—Catherine A. Simone
(74) Attorney, Agent, or Firm—Holland & Hart LLP; Christopher J. Kulish, Esq.

(57) ABSTRACT

The present invention is directed to a diffusion substrate assembly that is suitable for use in fuel cells. The diffusion substrate exhibits low flow resistance for active fuel agents and electrochemical reaction products, high electrical cross plane conductance and a good mechanical integrity. In one embodiment, the diffusion substrate includes carbon micro-studs that are in a substantially parallel relationship to one another and extend substantially perpendicular to a supporting bed.

26 Claims, 6 Drawing Sheets

MICRO-STUD DIFFUSION SUBSTRATE FOR USE IN FUEL CELLS

CROSS REFERENCE TO RELATED APPLICATIONS

This application claims priority under 35 U.S.C. §119 to prior U.S. Provisional Patent Application Ser. No. 60/187,781, filed Mar. 8, 2000, the entire contents of which are incorporated herein as if set forth herein in full.

BACKGROUND OF INVENTION

Electrochemical fuel cells convert fuel and oxidant into electricity and reaction product. With reference to FIG. 1, an electrochemical fuel cell 10 generally employ a membrane electrode assembly ("MEA") 12 comprising a solid polymer electrolyte or ion exchange membrane ("IEM")14 disposed between two electrode layers or substrates 16A, 16B formed of electrically conductive sheet material. The electrode substrate has a porous structure that renders it permeable to reactants and products in the fuel cell. The MEA also includes an electrocatalyst, typically disposed in a layer at each ion exchange membrane/electrode substrate interface, to induce the desired electrochemical reaction in the fuel cell. The electrodes are electrically coupled to electrical charge collecting plates to provide a path for conducting electrons between the electrodes through an external load. At the anode, the fuel stream moves through the porous anode substrate and is oxidized at the anode electrocatalyst. At the cathode, the oxidant stream moves through the porous cathode substrate and is reduced at the cathode electrocatalyst.

In electrochemical fuel cells employing hydrogen, hydrogenated inert gas or other hydrogen rich agent as the fuel and oxygen or air as the oxidant, the catalyzed reaction at the anode produces hydrogen cations (protons) from the fuel supply. The ion exchange membrane, which is also known as the proton exchange membrane ("PEM"), facilitates the migration of protons from the anode to the cathode. In addition to conducting protons, the membrane isolates the hydrogen-containing fuel stream from the oxygen-containing oxidant stream. At the cathode electrocatalyst layer, oxygen reacts with the protons that have crossed the membrane to form water as the reaction product.

In electrochemical fuel cells, the MEA is typically interposed between two separator plates or reactants flow field plates (anode and cathode plates) 18A, 18B. The plates typically act as current (electrical charge) collectors and provide support to the MEA. Reactants flow field plates typically have channels, grooves or passageways 20 formed therein to provide means for access of the fuel and oxidant streams to the porous anode and cathode substrates, respectively.

The electrode substrates of an MEA, which are also known as the porous diffusion substrate or diffusion substrate, are responsible for: (1) delivering active fuel agents such as hydrogen or methanol from the channels defined by the the flow field plates to the surface of the PEM membrane; (2) providing a flow path for electrical charge from the PEM or ion exchange membrane surface to an electrically conductive charge collecting plate, typically interfaced to or part of the metallic body of the active fuel agent flow field plate; (3) chemically insulating of the charge collecting plate or the metallic flow field plate from the reactive surface of the PEM or IEM membrane; and providing for proper moisturizing of PEM or IEM membrane and removal of reaction products.

The material used for the porous electrode substrate or diffusion substrate is electrically conductive to provide a conductive path between the electrocatalyst reactive sites and the charge or current collectors. There are a great numbers of substances qualifying as a sufficiently good for manufacturing the porous electrode substrate. All of them however exhibit one or more negative characteristics, such as: (1) substantial resistance to electric current flow; (2) degradation and corrosion as a result of exposure to reactants, catalysts and ion exchange membrane in fuel cell operation; (3) poor mechanical characteristics like integrity, uniformity or stiffness; (4) complex construction involving the combination of several components; and (5) difficulty in optimizing for high permeability for the reactants and low electrical resistance, which are mutually opposed parameters.

At present, a preferred type of porous diffusion substrate for reactive agents is formatted with polymer or carbon fiber cloth or paper saturated with graphite particles. Such substrate is characterized by: (1) low porosity or highly variable porosity that restricts the flow of active fuel agents and requires relatively high positive pressure to enable the flow of the active fuel agents; (2) a high electrical cross-resistance that causes substantial power loss and heat dissipation as a result of electric current flow through; (3) low mechanical stability of the graphite particles that in the long run can contribute to unsafe operational conditions and internal electrical shorts; and (4) mechanical compressibility that causes substantial performance variation through variation in the electrical cross-conductance, variation in the resistance to the flow of active fuel agents, variation in the quality of contact with PEM, and potential blockage of flow field channels.

Some of those negative characteristics are partially negotiated by an intermediate metallic grid inserted between the diffusion substrate and ridges of charge collecting plate of the flow field metal plates. The positive electrical benefits of the grid are not completely realized due to the relatively high electrical resistance of the diffusion substrate.

SUMMARY OF INVENTION

The present invention provides a solution to the problem of the internal power loss in fuel cell assembly attributable to the electrical resistance of present diffusion substrates.

The diffusion substrate is comprised of a base and bed structure that has relatively low-cross plane resistance, relatively stable porosity for reactant flow, mechanical characteristics that promote low cross-plane resistance and stable porosity, and resistance to degrading influences.

In one embodiment, the bed of the diffusion substrate is comprised of a plurality of micro-studs that are operatively attached to the base, capable of conducting electrical charge, and extend between two surfaces. Additionally, the bed includes a plurality of channels that extend between the two surfaces and provide paths for the reaction constituents. The micro-studs can take several forms. In one embodiment, the micro-studs are open-ended, nanotubes ("NTs"), such as single walled nanotubes ("SWNTs") and multi-wall nanotubes ("MWNTs"). With open-ended nanotubes, at least some of the channels that are used to transport the reaction constituents are realized by the holes extending between the open ends of the nanotubes. Additionally, the open-ended nanotubes are capable of conducting the electrical charge resulting from the operation of a fuel cell. In one embodiment, open-ended, carbon nanotubes are used because of their low axial resistance. However, open-ended nanotubes made of other conductive material are also feasible.

Other embodiments of the diffusion substrate utilize nanotube ropes and fiber studs. In these embodiments, at least some of the channels that are used to transport the reaction constituents are the interstices situated between the ropes or fiber studs. The nanotube ropes and fiber studs are capable of conducting the electrical charge produced by the fuel cell and, at least in one embodiment, are made of carbon.

In a further embodiment, the diffusion substrate utilizes a bed that is comprised of a plurality of columnar elements that are operatively attached to the base and extend between two surfaces. The columnar elements also have longitudinal axes that are substantially parallel to one another and are capable of conducting electrical charge. In one embodiment, the columnar elements are substantially perpendicular to the at least one of the noted surfaces. In various embodiments, the columnar elements are implemented with open-ended nanotubes, nanoropes and fiber studs.

BRIEF DESCRIPTION OF DRAWINGS

Said drawings are illustrating concept of a diffusion substrate constructed with carbon micro-stud elements interconnected by metallic permeable base. The place occupied by diffusion layer in the preferable application of fuel cell stack assembly is also illustrated.

DETAILED DESCRIPTION

The present invention generally relates to electrochemical fuel cells and, more particularly, to the diffusion substrate portion of an electrochemical fuel cell. The present invention provides a diffusion substrate structure with improved electromechanical characteristics, more specifically, reduced flow resistance for cross plane flow of active fuel agents and reaction products, and reduced electrical resistance in the direction perpendicular to the plane of said substrate.

Figure 1:
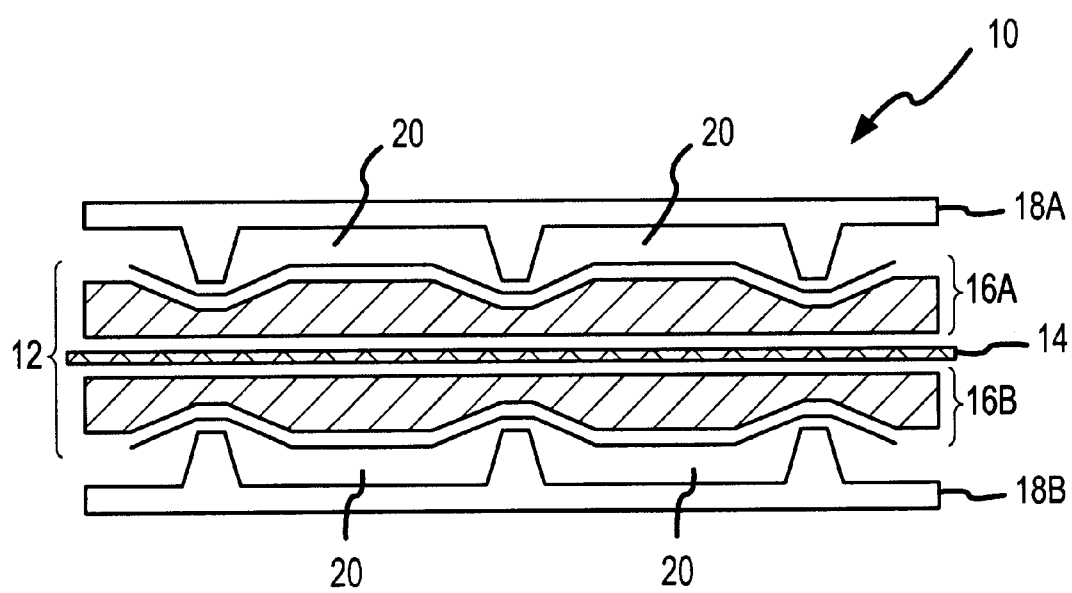
FIG. 1 illustrates a fuel cell with a prior art diffusion substrate.
Figure 2:
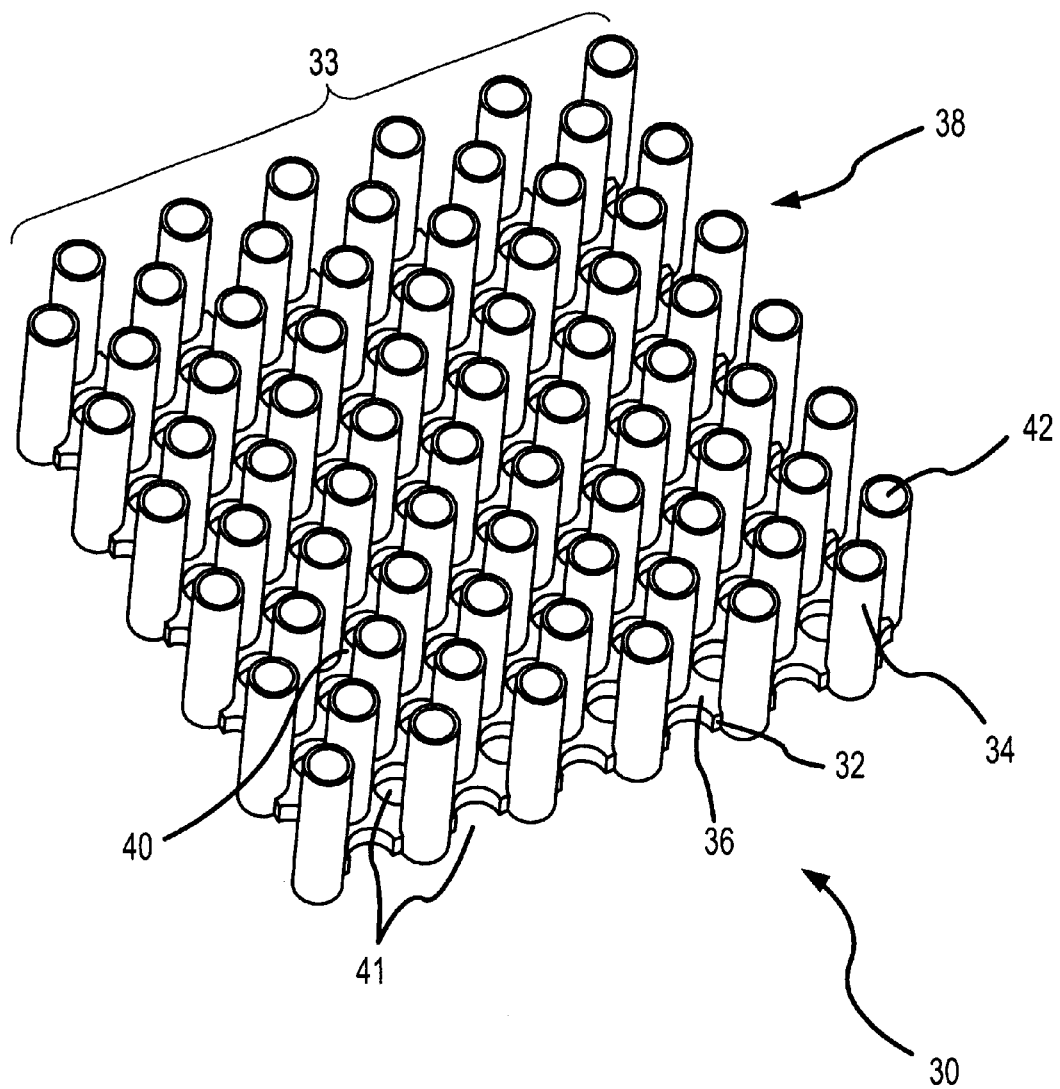
FIG. 2. illustrates a fragment of diffusion substrate wherein the bed of the substrate is created by parallel aligned Open Ended Single Walled Nanotubes interconnected by metallic base.

FIG. 2 illustrates a portion of a diffusion substrate 30 according to the present invention. The substrate includes a base 32 and a bed 33 formed of plurality of micro-studs 34 that extend from a first surface 36 associated with the base 32 to a second surface 38 defined by the free ends of the micro-studs 34. The base 32 surrounds the ends of the micro-studs and serves to integrate or tie together the ends of the micro-studs 34 to form the substrate. Additionally, the base 32 is made of a metal that is capable of conducting the electrical charge produced in a fuel cell and porous so that the reaction constituents can move within a fuel cell.

The micro-studs 34 are also capable of conducting the electrical charge produced within a fuel cell and define channels through which the reaction constituents pass. Additionally, the micro-studs 34 are aligned so that they are substantially parallel to one another and substantially perpendicular to at least one of the first and second surfaces 36, 38. By positioning the micro-studs 34 in this manner, the micro-studs function as an array of columns that provide a high degree of structural integrity, rigidity and resistance to compressional forces.

The diffusion substrate 30 shown in FIG. 2 utilizes a particular type of micro-stud, namely, a nanotube. Nanotubes exhibit superior mechanical strength, stiffness, controlled and low electrical resistance, chemical stability and inner surface transmission characteristics for the gaseous and liquid molecules commonly used as active fuel agents in electrochemical fuel cell operation. The nanotubes are electrically conductive and therefore provide a mechanism for transporting electrical charge in the direction away from PEM or IEM membrane. In the illustrated embodiment, carbon nanotubes are utilized due to their low resistance characteristic.

However, other types of electrically conductive nanotubes are also feasible. In the case of closed-end nanotubes (multi-walled or single-walled), the voids 40 between the nanotubes together with holes 41 that extend through the base 32 provide paths for transporting the active fuel agents from the fuel flow field to the PEM or IEM in a fuel cell. In the case of open-ended nanotubes, holes 42 extend between the open end that is exposed at the first surface 36 and the open end that is exposed at the second surface 38 to provide paths for transporting the active fuel agents from fuel flow field to PEM or IEM in a fuel cell. Additionally, voids or channels 42 can be provided between the open-ended nanotubes to provide additional paths for transporting the active fuel agents. In the illustrated embodiment, the nanotubes are open-ended, single-walled nanotubes ("SWNT"). Open-ended, multi-walled nanotubes can also be utilized for greater structural rigidity, but this will generally involve sacrificing space that could be used to provide voids or channels for transporting the reaction constituents.

Several processes for constructing the diffusion substrate are possible. In one embodiment the bed 33 of substrate is constructed with short, open-ended SWNT that are aligned perpendicularly to the plane of the substrate through the process of electromagnetic manipulation, bonded together at an elevated temperature with a low resistivity binding substance, and supported by metallic base coating that is deposited on a surface of substrate bed by, for example, vapor deposition. Any holes in the base can be established as part of the deposition process, by surface etching after deposition, or any other suitable process.

In another embodiment, the nanotubes are "grown" directly from a support plane (which becomes the base for the bed) and perpendicularly to it. Nanotubes can also be grown by establishing a movable magnetic field along a reactor tube filled with solution in which process of nanotube formation is initiated and sustained with metallic and ferromagnetic doppants.

Figure 3:
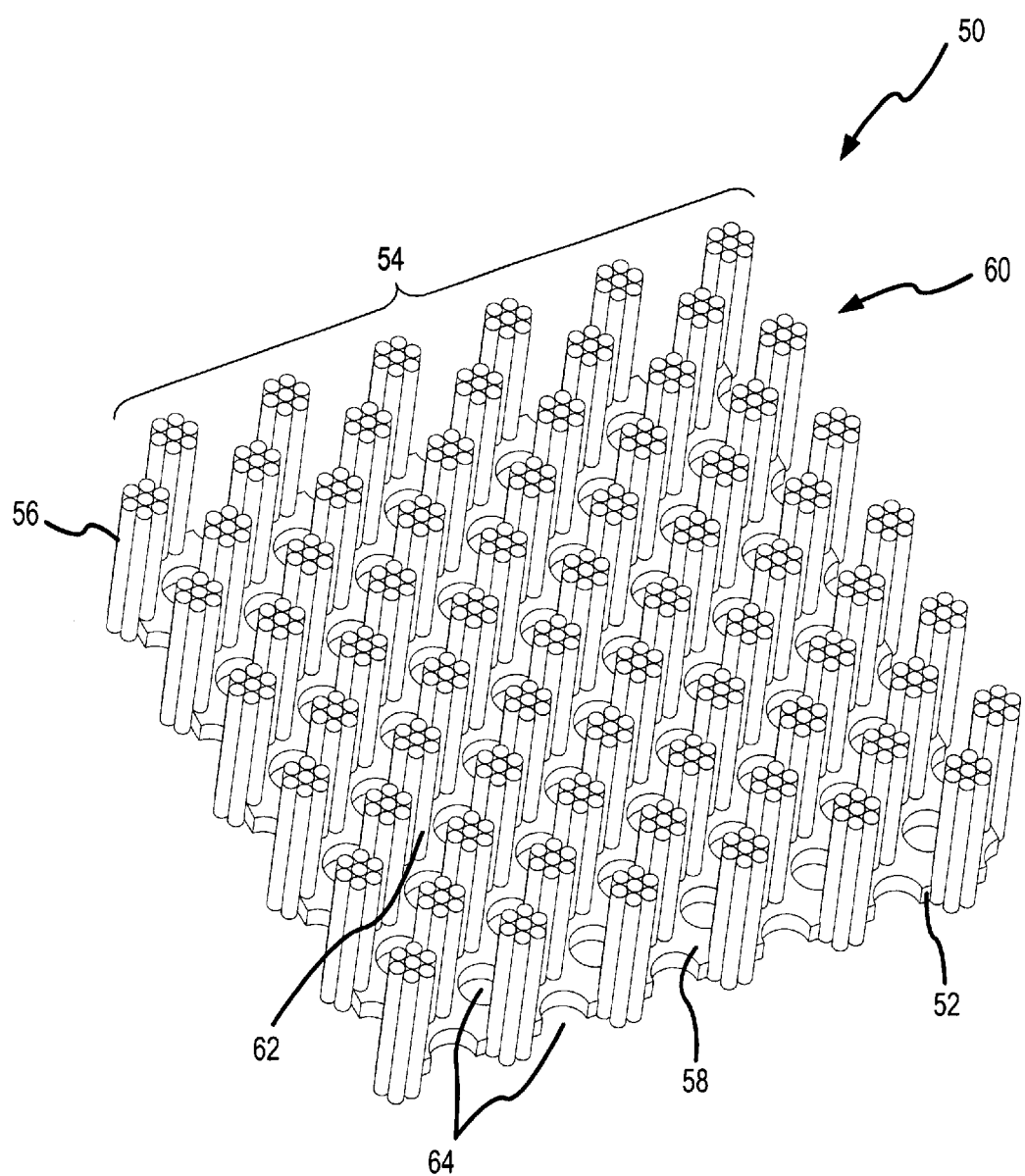
FIG. 3. illustrates a fragment of diffusion substrate wherein the bed of the substrate is created by parallel aligned carbon Nanotube Ropes interconnected by a metallic base and the bed has plurality of small voids between said ropes for transporting reaction constituents.

FIG. 3 illustrates a second embodiment of a diffusion substrate 50 according to the present invention. The substrate 50 includes a base 52 and a bed 54 constructed of a plurality of SWNT ropes 56, a second type of micro-stud, that are each comprised of SWNTs that aligned and bonded together to form a substantially large diameter bundle or rope. It is also feasible to use closed-end, multi-walled nanotubes for the bed 54. The base 52 surrounds the ends of the SWNT ropes 56 and thereby serves to integrate the SWNT ropes 56 with one another to form the substrate. The base 52 is also made of a metal that is capable of conducting the electrical charge produced in a fuel cell. The base is also porous so that reaction constituents can move within a fuel cell. In the illustrated embodiment, carbon SWNT ropes are utilized because of their low resistivity. However, other types of electrically conductive ropes are also feasible. The SWNT ropes 56 extend from a first surface 58 associated with the base 52 to a second surface 60 defined by the free ends of the SWNT ropes 56. Additionally, the SWNT ropes 56 are aligned so that they are substantially parallel to one another and substantially perpendicular to at least one of the first and second surfaces 58, 60. By positioning the SWNT ropes 56 in this manner an array of columns is formed that provides a high degree of structural integrity and rigidity. The substrate 50 further includes voids 62 between the SWNT ropes 56 that together with holes 64 in the base 52 provide paths for the active fuel agents to move within a fuel cell.

The manufacture of the substrate 50 is believed to be less technically demanding that the manufacture of the substrate 30. To elaborate, nanotubes can be formed into elongated nanotube ropes. A plurality of densely packed and aligned nanotube ropes are formed into a bundle and bonded together with high strength resin. The bundle is then sliced in the plane perpendicular to the longitudinal axes of aligned ropes. The resulting thin plates are coated on one side with a metallic supporting substance that forms the base 52 of the diffusion substrate 50. Electrolysis, vacuum deposition process, or any other suitable process can be used to perform the coating. The bonding agent between the nanotube ropes 52 is then removed to form the voids 62. The holes 64 are established in the base 64 either as part of the deposition process, etching subsequent to the deposition process, or by any other suitable process.

Figure 4:
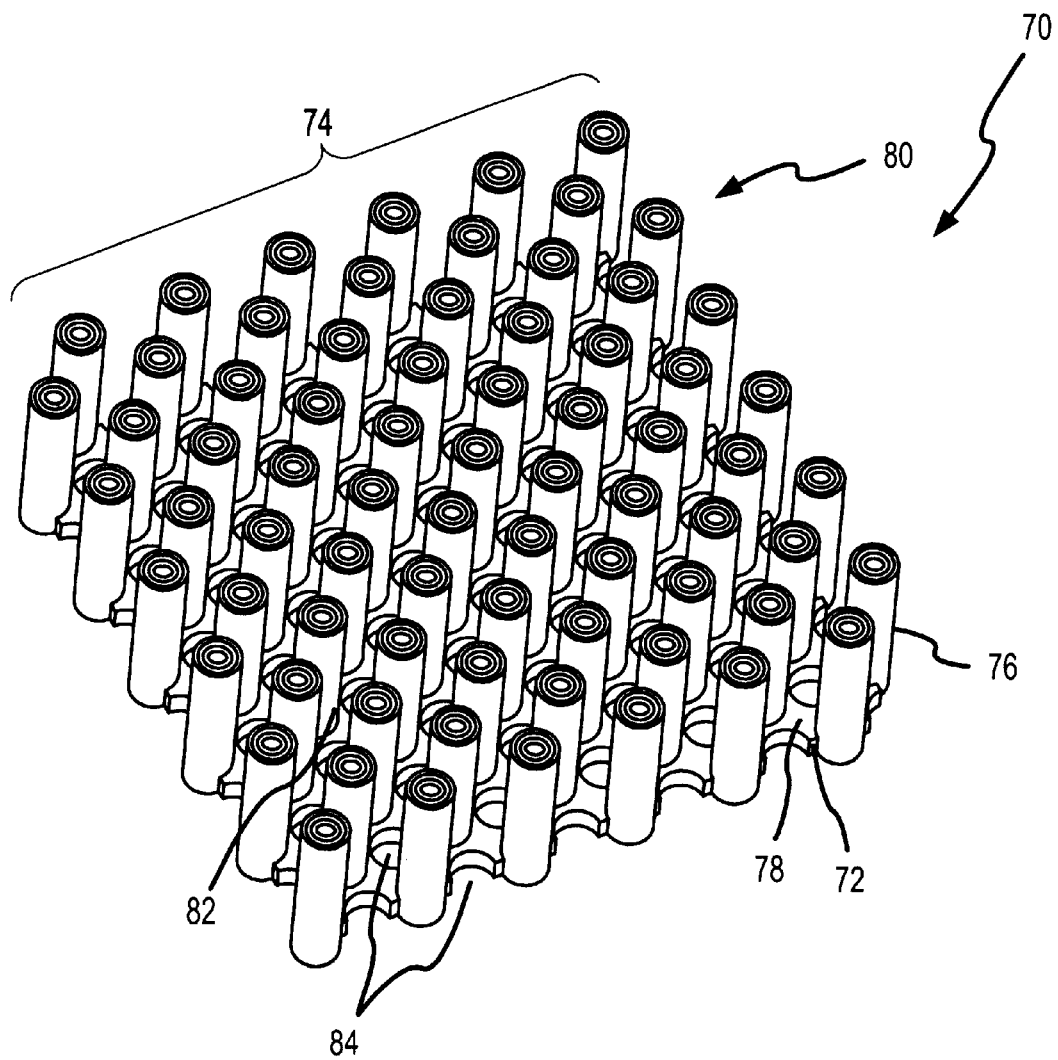
FIG. 4. illustrates a fragment of diffusion substrate wherein the bed of the substrate is created by parallel aligned carbon fiber studs interconnected by metallic base and the bed has plurality of distinct voids between said fiber studs for transporting reaction constituents.

FIG. 4 illustrates a third embodiment of a diffusion substrate 70 according to the present invention. The substrate 70 includes a base 72 and a bed 74 constructed of a plurality of fiber studs 76, a third type of micro-stud. The base 72 surrounds the ends of the fiber studs 76 and thereby serves to integrate the fiber studs 76 with one another to form the substrate. The base 72 is also made of a metal that is capable of conducting the electrical charge produced in a fuel cell. The base 72 is also porous so that reaction constituents can move within a fuel cell. In the illustrated embodiment, carbon fiber studs are utilized because of their high conductivity. However, other types of electrically conductive fiber studs are also feasible. The fiber studs 76 extend from a first surface 78 associated with the base 72 to a second surface 80 defined by the free ends of the fiber studs 76. Additionally, the fiber studs 76 are aligned so that they are substantially parallel to one another and substantially perpendicular to at least one of the first and second surfaces 78, 80. By positioning the fiber studs 76 in this manner an array of columns is formed that provides a high degree of structural integrity and rigidity. The substrate 70 further includes voids 82 between the fiber studs 76 that together with holes 84 in the base 72 provide paths for the active fuel agents to move within a fuel cell. The manufacture of the substrate 70 is substantially similar to the manufacture of the substrate 50.

Figure 5:
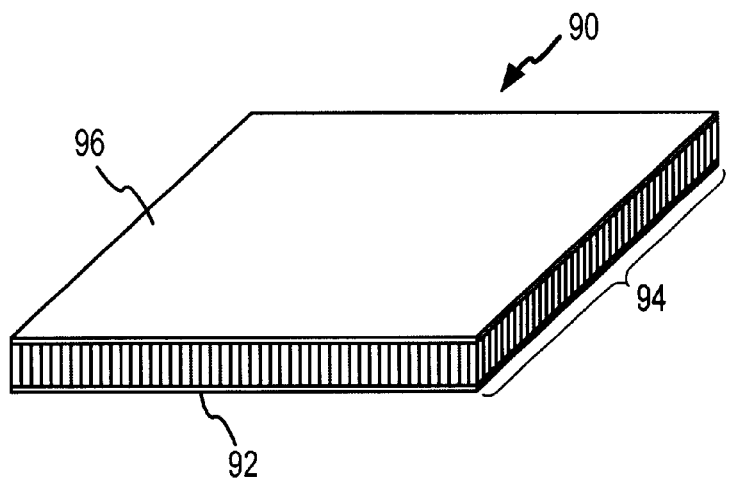
FIG. 5. illustrates a fragment of diffusion substrate wherein the base and surface are two opposed sides of flat, thin layer of micro-studs.

FIG. 5 illustrates a substrate 90 comprised of a base 92 and a bed 94 formed of a plurality of micro-studs. An electrocatalyst layer 96 for promoting the electrochemical reaction in a fuel cell and suitable for interfacing with a PEM or IEM has been established on the upper surface of the bed 92, i.e., the surface of the 94 opposite from the surface of the bed with which the base 92 is associated.

Figure 6:
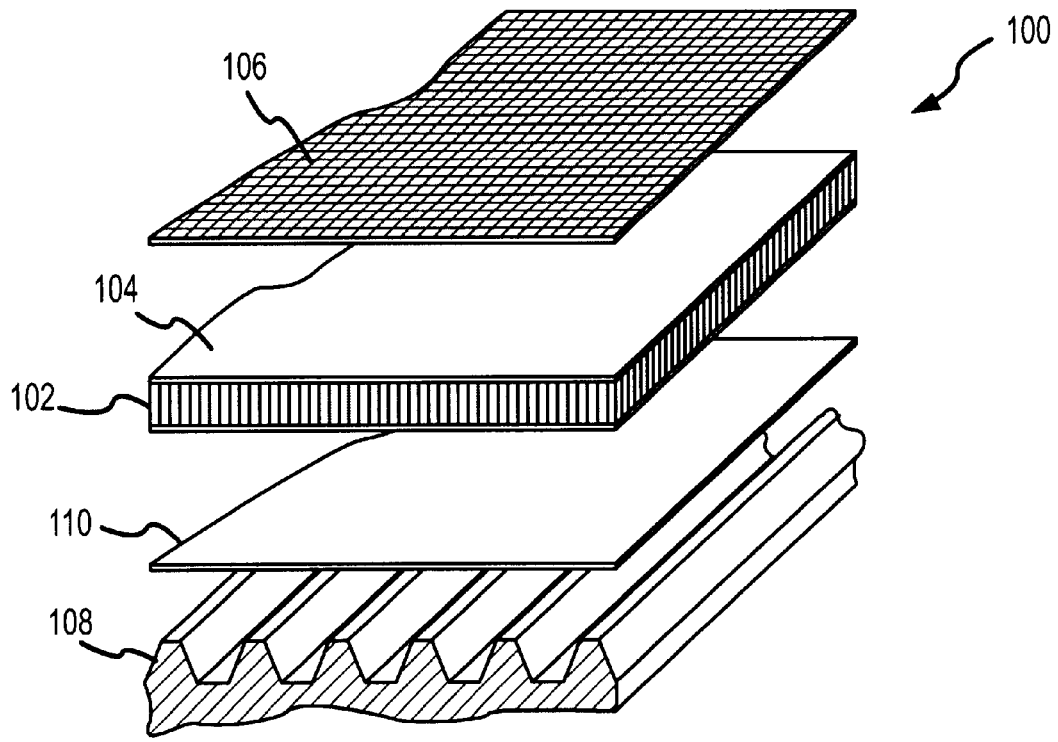
FIG. 6. illustrates a fuel cell stack layered construction where micro-stud diffusion substrate is located between metallic grid and PEM membrane.

FIG. 6 is an exploded view of a fuel cell stack 100 that includes a micro-stud diffusion substrate 102, an adjoining electrocatalyst layer 104, PEM or IEM 106, flow field plate 108, and a metallic grid layer 110. The metallic grid layer 110 supports the diffusion substrate 102 and provides a low loss flow path for electric charge collected by metallic base of the substrate 102 to reach the flow field plate 108 In some implementations, the diffusion substrate 102 may not need the support provided by the metallic grid layer 110 and the low resistance path provided by the metallic grid layer 110, which is typically implemented using relatively large diameter wires. In such cases, it is possible to eliminate the grid layer 110.

Figure 7:
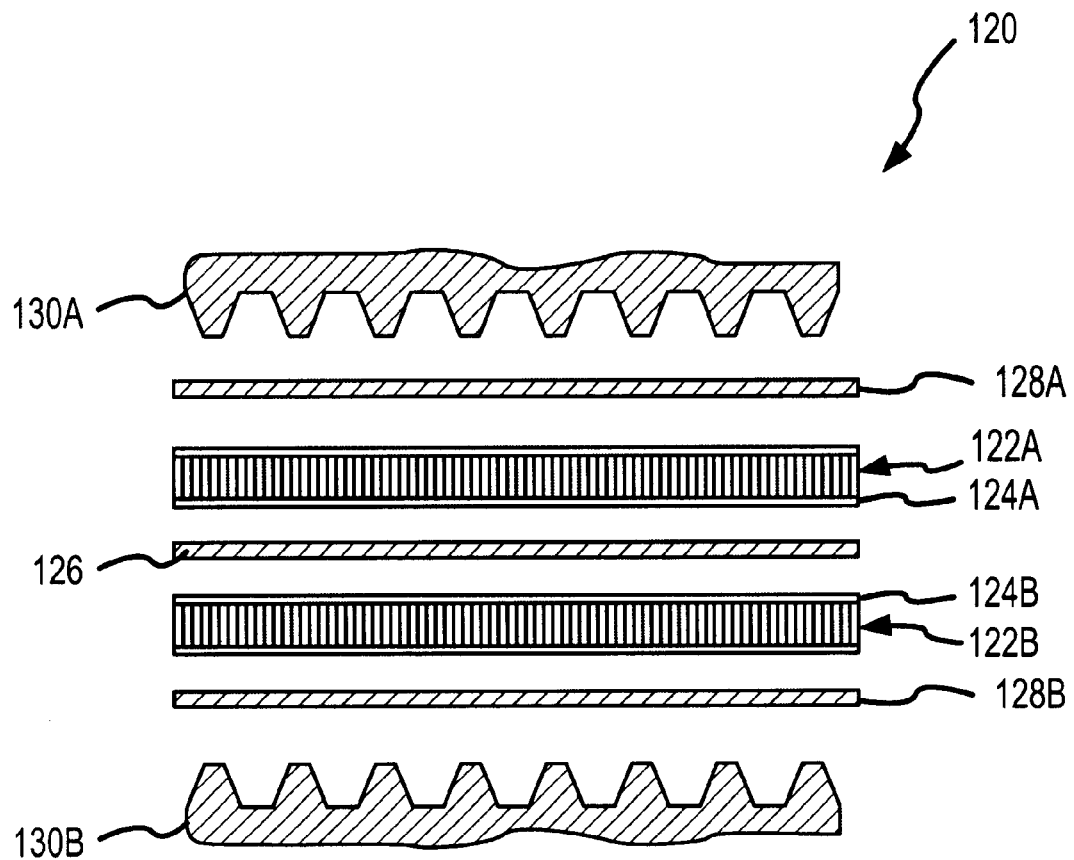
FIG. 7. is an exploded, cross-sectional view of a single cell fuel cell stack.

FIG. 7 is an exploded, cross section of an entire fuel cell 120 that includes first and second micro-stud diffusion substrates 122A, 122B and adjoining first and second catalyst layers 124A, 124B. The fuel cell 120 further includes a PEM or IEM 126 and first and second grids 128A, 128B for transferring electrical charge to first and second flow field plates 130A, 130B.

When the fuel cell 120 is in operation, the flow of fuel reactants through the paths established in the micro-stud substrates 122A, 122B results from the adsorption mechanism characteristic of the micro-stud structures as well as from the pressure gradient across the substrates.

The flow of electric charge in the fuel cell is facilitated by the low cross-plane resistance of a substrate made of fiber studs, nanotube ropes or nanotubes. In the case of carbon SWNT ropes, the resistance is estimated to be $0.3 \times 10^{-4}$ ohm/cm to $1 \times 10^{-4}$ ohm/cm, which is closer to the resistance of metal than the resistance of traditional carbon material like carbon cloth or carbon paper, commonly used in fuel cell technology as a diffusion substrate.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The embodiments described hereinabove are further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claim is:

1. A diffusion substrate suitable for use within a fuel cell, comprising:

a base for conducting electrical charge and porous so that at least one fuel cell reaction constituent is capable of moving between a first side of said base and a second side of said base that is separated from said first side of said base; and a bed that is attached to said first side of said base and comprised of a plurality of micro-stud elements that each have a first end and a second end, said plurality of micro-stud elements extending between a first surface and a second surface which is substantially parallel to said first surface, said first surface defined by a plurality of said first ends of said micro-stud elements, said second surface defined by a plurality of said second ends of said micro-stud elements, said micro-stud elements for conducting electrical charge between said first and second surfaces, said bed further comprised of channels that extend between said first and second surfaces and are for transporting at least one fuel cell reaction constituent.

2. A diffusion substrate, as claimed in claim 1, wherein: said plurality of micro-stud elements include carbon micro-stud elements.

3. A diffusion substrate, as claimed in claim 1, wherein: said plurality of micro-stud elements include nanotubes.

4. A diffusion substrate, as claimed in claim 3, wherein: said nanotubes include carbon nanotubes for conducting electrical charge.

5. A diffusion substrate, as claimed in claim 3, wherein: said nanotubes include open-ended nanotubes for transporting reaction constituents.

6. A diffusion substrate, as claimed in claim 3, wherein: said nanotubes include single-walled nanotubes that have only one wall.

7. A diffusion substrate, as claimed in claim 3, wherein: said nanotubes include open-ended, carbon nanotubes.

8. A diffusion substrate, as claimed in claim 3, wherein: said nanotubes include open-ended, single-walled, carbon nanotubes that have only one wall.

9. A diffusion substrate, as claimed in claim 1, wherein: said plurality of micro-stud elements include a rope of aligned and bonded nanotubes.

10. A diffusion substrate, as claimed in claim 1, wherein: said plurality of micro-stud elements include fiber studs that are electrically conductive.

11. A diffusion substrate, as claimed in claim 1, wherein: said plurality of micro-stud elements having longitudinal axes that are substantially parallel to one another and substantially perpendicular to one of said first and second surfaces so as to provide structural integrity, rigidity and resistance to compressional forces.

12. A diffusion substrate, as claimed in claim 3, wherein: said channels are located one of between said plurality of micro-studs elements and inside said plurality of micro-stud elements.

13. A diffusion substrate suitable for use within a fuel cell, comprising:
a base for conducting electrical charge and porous so that at least one fuel cell reaction constituent is capable of moving between a first side of said base and a second side of said base that is separated from said first side of said base; and
a bed that is attached to said first side of said base and comprised of a plurality of columnar elements that each have a first end and a second end, said plurality of columnar elements extending between a first surface and a second surface which is substantially parallel to said first surface, said first surface defined by a plurality of said first ends of said columnar elements, said second surface defined by a plurality of said second ends of said columnar elements, said columnar elements for conducting electrical charge between said first and second surfaces, said columnar elements having longitudinal axes that are substantially parallel to one another and extend between said first and second surfaces so as to provide structural integrity and rigidity, said bed further comprised of channels that extend between said first and second surfaces and for transporting at least one fuel cell reaction constituent.

14. A diffusion substrate, as claimed in claim 13, wherein: said longitudinal axes are substantially perpendicular to one of said first and second surfaces so as to provide resistance to compressional forces.

15. A diffusion substrate, as claimed in claim 14, wherein: said channels are located between said columnar elements.

16. A diffusion substrate, as claimed in claim 14, wherein: said channels are located inside said columnar elements.

17. A diffusion substrate, as claimed in claim 13, wherein: said plurality of columnar elements include carbon columnar elements.

18. A diffusion substrate, as claimed in claim 13, wherein: said plurality of columnar elements include micro-stud elements.

19. A diffusion substrate, as claimed in claim 18, wherein: said micro-stud elements include nanotubes.

20. A diffusion substrate, as claimed in claim 18, wherein: said micro-stud elements include a rope of aligned and bonded nanotubes.

21. A diffusion substrate, as claimed in claim 18, wherein: said micro-stud elements include a fiber stud that is electrically conductive.

22. A diffusion substrate suitable for use within a fuel cell, comprising:
a base for conducting electrical charge and porous so that at least one fuel cell reaction constituent is a capable of moving between a first side of said base and a second side of said base that is separated from said first side of said base; and
a bed that is attached to said first side of said base and comprised of a plurality of micro-stud elements that each have a first end and a second end, said plurality of micro-stud elements extending between a first surface and a second surface which is substantially parallel to said first surface, said first surface defined by a plurality of said first ends of said micro-stud elements, said second surface defined by a plurality of said second ends of said micro-stud elements, said micro-stud elements for conducting electrical charge between said first and second surfaces, said plurality of micro-stud elements having longitudinal axes that are substantially parallel to one another, substantially perpendicular to one of said first and second surfaces and extend between said first and second surfaces so as to provide structural integrity, rigidity and resistance to compressional forces, said bed further comprised of channels that extend between said first and second surfaces and for transporting at least one fuel cell reaction constituent.

23. A diffusion substrate, as claimed in claim 22, wherein: said plurality of micro-stud elements include carbon micro-stud elements.

24. A diffusion substrate, as claimed in claim 22, wherein: said plurality of micro-stud elements include nanotubes.

25. A diffusion substrate, as claimed in claim 22, wherein: said plurality of micro-stud elements include a rope of aligned and bonded nanotubes.

26. A diffusion substrate, as claimed in claim 22, wherein: said plurality of micro-stud elements include a fiber stud that is electrically conductive.

* * * * *

UNITED STATES PATENT AND TRADEMARK OFFICE
CERTIFICATE OF CORRECTION

PATENT NO. : 6,689,439 B2
DATED : February 10, 2004
INVENTOR(S) : Zbigniew S. Sobolewski It is certified that error appears in the above-identified patent and that said Letters Patent is hereby corrected as shown below:

Column 8,
Line 23, delete "is a capable", and insert -- is capable --.

Signed and Sealed this

Fourth Day of May, 2004

JON W. DUDAS
*Acting Director of the United States Patent and Trademark Office*